United States Patent
Morrow et al.

(10) Patent No.: US 10,328,589 B2
(45) Date of Patent: Jun. 25, 2019

(54) KNIFE BLADE EDGE SERRATIONS AND METHOD THEREFOR

(71) Applicant: Wisconsin Alumni Research Foundation, Madison, WI (US)

(72) Inventors: Justin D. Morrow, Madison, WI (US); Frank E. Pfefferkorn, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 239 days.

(21) Appl. No.: 15/235,886

(22) Filed: Aug. 12, 2016

(65) Prior Publication Data

US 2018/0043562 A1 Feb. 15, 2018

(51) Int. Cl.
| | |
|---|---|
| *B62D 1/00* | (2006.01) |
| *B23K 26/16* | (2006.01) |
| *B26D 1/00* | (2006.01) |
| *B26B 9/02* | (2006.01) |
| *B23K 26/354* | (2014.01) |
| *B23K 26/36* | (2014.01) |
| *B23K 101/20* | (2006.01) |

(52) U.S. Cl.
CPC .......... *B26D 1/0006* (2013.01); *B23K 26/354* (2015.10); *B23K 26/36* (2013.01); *B26B 9/02* (2013.01); *B23K 2101/20* (2018.08); *B26D 2001/002* (2013.01); *B26D 2001/006* (2013.01)

(58) Field of Classification Search
CPC ............ B26D 1/0006; B26D 2001/002; B26D 2001/006; B23K 26/082; B23K 26/0081; B23K 26/16; B23K 26/36; B23K 2101/20; B26B 9/02
See application file for complete search history.

(56) References Cited

U.S. PATENT DOCUMENTS

| | | | |
|---|---|---|---|
| 2013/0049438 A1* | 2/2013 | Nootbaar | A46D 9/02 300/17 |
| 2016/0157423 A1* | 6/2016 | Stoffel | A01F 29/09 148/525 |
| 2018/0133859 A1* | 5/2018 | Landwehr | B23Q 17/0995 |

OTHER PUBLICATIONS

Giovannini et al., "Experimental and Analytical Study of Micro-Serrations on Surgical Blades;" Proceedings of the ASME 2015 International Technical Conference and Exhibition on Packaging and Integration of Electronic and Photonic Microsystems, InterPACK2015, San Francisco, CA, Jul. 6-9, 2015 (7 pgs); IPACK2015-48046. Downloaded from: http://asmedigitalcollection.asme.org/ on Feb. 9, 2016.

(Continued)

*Primary Examiner* — Omar Flores Sanchez
(74) *Attorney, Agent, or Firm* — Crawford Maunu PLLC

(57) ABSTRACT

Various aspects of the present disclosure are directed toward blades having serrations, and methods for forming the serrations. As may be implemented in accordance with one or more embodiments, laser light is scanned across a surface of a knife blade in which the laser light is intersected with an edge thereof. The laser light is used to serrate the edge of the knife blade by generating heat in the knife blade while the laser light is scanned, melting portions of the knife blade at serration regions at the edge, and removing the melted portions. This approach may be carried out without registering an accurate location of the knife edge, and while also melting portions of the knife blade away from the edge.

20 Claims, 5 Drawing Sheets

(56) References Cited

OTHER PUBLICATIONS

Velasquez et al., "Feasibility of Laser Surface Texturing for Friction Reduction in Surgical Blades;" Proceedings of the ASME 2013 International Manufacturing Science and Engineering Conference, MSEC2013, Madison, WI, Jun. 10-14, 2013 (9 pgs); MSEC2013-1193. Downloaded from: http://proceedings.asmedigitalcollection.asme.org/ on Feb. 12, 2016.
Morrow et al., "Local Microstructure and Hardness Variation After Pulsed Laser Micro Melting on S7 Tool Steel," Manuscript Draft, not yet published (2016).
Morrow et al., "Balancing Surface Hardness and Smoothness during Pulsed Laser Micro Polishing," CIRP Annals Manufacturing Technology, vol. 1, Manuscript No. 2016-E-32R1 (2016).

\* cited by examiner

FIG. 4

KNIFE BLADE EDGE SERRATIONS AND METHOD THEREFOR

FIELD

Aspects of various embodiments are directed to knife blades, and to serrations therein.

BACKGROUND

Serrated knife blades are useful for a variety of applications. For instance, serrations can improve cutting ability for certain types of materials to be cut, such as for industrial, home or outdoor use. Serrations can decrease an amount of blade that contacts a surface of a material being cut, with protrusions, or points, achieving a higher pressure than might be achieved with a plain, or non-serrated edge.

While useful, manufacturing knife blades with serrated edges can be time consuming and expensive. For instance, it can be difficult to process knife blade edges relative to other portions of the knife blade, for serration. These and other matters have presented challenges to the design and manufacture of knife blades, for a variety of applications.

SUMMARY

Various example embodiments are directed to knife blades and their implementation.

According to an example embodiment, methods and/or apparatuses involve knife blades having serrations. Laser light is scanned across a surface of a knife blade in which the laser light is intersected with an edge thereof. The laser light is used to serrate the edge of the knife blade by generating heat in the knife blade while the laser light is scanned, melting portions of the knife blade at serration regions at the edge, and removing some or all of the melted portions (e.g., a re-melted region may be left behind, which subsequently solidifies as it cools).

As may be implemented with one or more embodiments, a knife blade apparatus includes an edge portion having a plurality of serrations, and a plurality of recrystallized (re-solidified) scan regions that extend from the serrations in scan lines along a surface of the knife blade. Each recrystallized scan region includes metal recrystallized from portions of the knife blade along the scan lines and extending to a depth below the surface.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIG. 4 shows a plot (amplitude vs. wavelength) of a Fourier transformed linear surface profile for a knife blade, as may be implemented in accordance with one or more embodiments.

Figure 1:
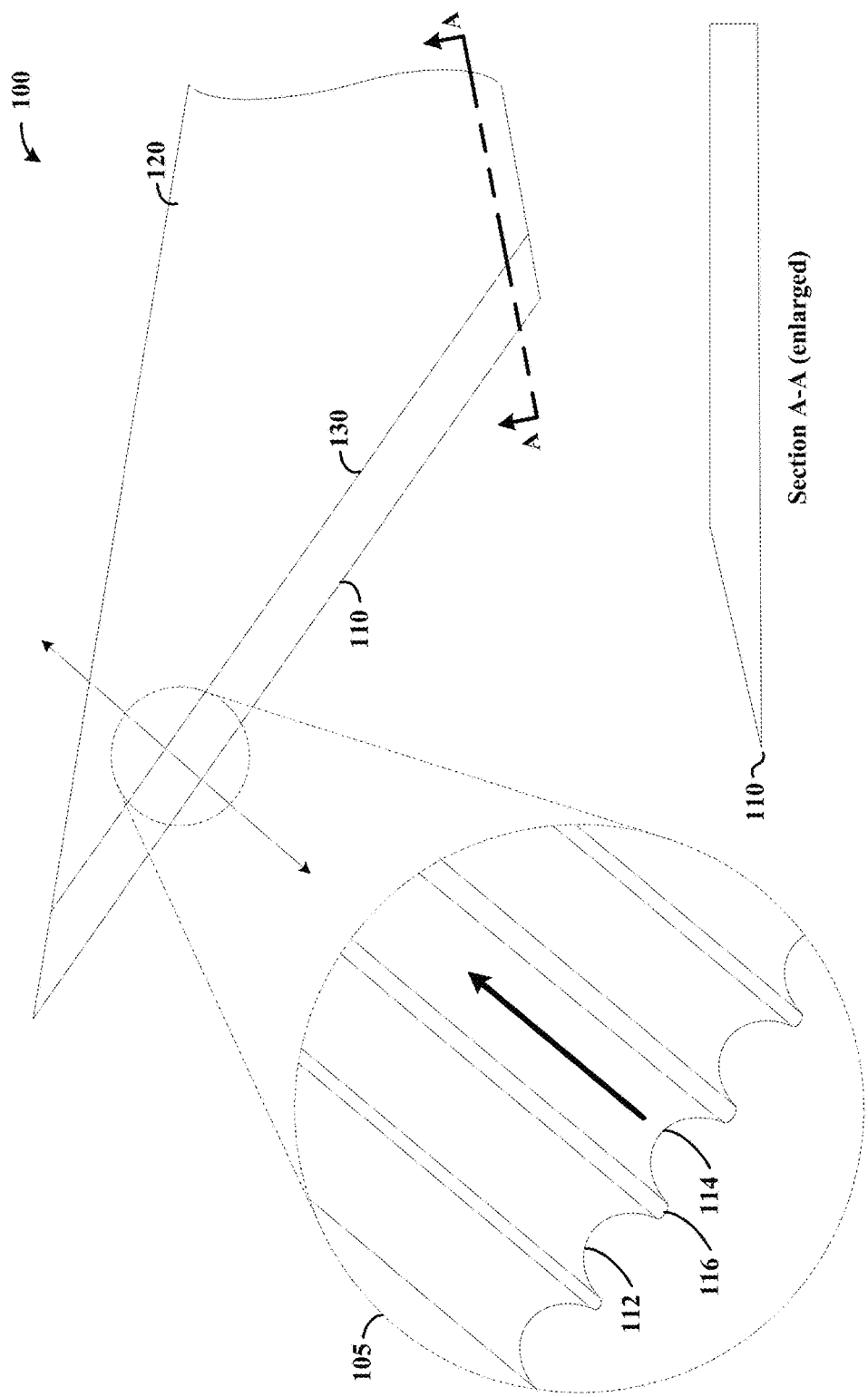
FIG. 1 shows a knife blade, in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving serrated knife blades and their manufacture. In certain implementations, aspects of the present disclosure have been shown to be beneficial when used in the context of generating knife blade serrations via melting, as may be achieved by scanning a laser across a surface of the knife blade. While not necessarily so limited, various aspects may be appreciated through a discussion of examples using such exemplary contexts.

Various embodiments involve scanning a laser across some or all of a knife blade, without necessarily using an edge of the knife blade as a reference. In connection with such embodiments, it has been recognized/discovered that such scanning is facilitated via melting achieved by scanning across a knife blade (e.g., from at a spine of the knife blade or a region between the spine and the edge). The scanning can be carried out by controlling the melt depth to create serrations while leaving portions of the knife blade away from the edge intact. This approach can facilitate scanning without having to limit the scanning to the knife edge and/or otherwise harming regions of the knife blade away from the knife edge. For instance, by utilizing the thickness of the knife blade itself as a heat sink control, thinner portions of the knife blade near the edge are melted completely through to create the serrations, while thicker portions of the knife blade are melted to a limited depth into the blade, with the melted portions re-solidifying after scanning. Further, this approach provides for a relatively forgiving process in which control of the scanning relative to the knife edge is not necessarily required, as the thickness of the knife blade can be utilized along with melting control to allow over-scanning onto other regions of the knife blade without causing undue damage. Accordingly, while a small amount of ablation may occur (e.g., near the knife edge), the primary mechanism is melting, with a significant skin of re-melted metal left inside the residual serration pattern. Such re-melted metal can be extremely hard, and provide good wear resistance.

Scanning can be carried out not only to form serrations, but to functionalize the sliding surface of the knife blade away from the knife edge. For instance, laser melted lines can be formed across the surface of a knife blade, and can functionalize the sliding surface and create serrations in one step. The residual linear features on the knife blade sliding surface alter/set the shape and contact area of the sliding surface. In some implementations, a residual film of oxide is formed to further modify the sliding properties.

In some embodiments, laser micro melting is used to create linear laser melted features on the sliding surface of a knife blade. Such a blade may, for example, be a relatively thin cutting blade, such as a craft knife blade, razor blade or scissors blade, or a larger blade such as a tree lopper blade or other manufacturing blade. A laser is scanned across the cutting edge, where a portion of material is locally removed to form a serration pattern. The pattern can be set by the spot shape of the laser, such as by forming a half-circle shaped serration pattern with a circular laser spot, or a triangular serration pattern with a square or rectangular laser spot. The laser lines can be spaced in such a way that the serrations do not overlap, overlap slightly, are separated by a predefined distance, and/or are varied along the knife edge.

A variety of types of lasers can be used to create serrations. For instance, pulsed wave lasers, continuous wave lasers, or a combination thereof can be used to create one or more serrations on a knife blade. Different types of serrations can be made at different regions of the knife blade edge. The laser can also be focused to a desired spot size to suit particular applications. In some implementations, a micro-scale focused laser spot (e.g., under 1 mm) is scanned along a knife blade surface and across the cutting edge. For larger blades, such as a tree-cutting blade or other outdoor blade, or a blade used in a manufacturing environment, a larger laser spot may be used to effect the serration.

Scan lines can be formed in a variety of manners, and positioned relative to one another in different ways. In some embodiments, linear lines are scanned generally perpendicular to the cutting edge of a knife blade, or to a portion of the cutting edge. In other embodiments, lines are scanned at different angles relative to the cutting edge and/or each other, to provide a desired resulting pattern. Symmetric or asymmetric patterns can be used. These approaches can be implemented without necessarily knowing or indexing the precise location of the cutting edge of the knife blade.

In some instances, scanning is used to create roughness in re-solidified portions of the knife blade, which can be used to facilitate sliding of the knife blade while cutting through material. This can also facilitate sliding of the cut material along the blade. In some instances, the re-solidified portions are formed as channels that channel away removed material. The channels can be tailored in direction to facilitate such material removal.

Formation of the serrations can be carried out in a variety of environments. In some embodiments, the serrations are formed in a low-oxygen environment. In other embodiments, the serrations are formed in an open atmosphere or environment in which relatively high amounts of oxygen are present, to facilitate oxidation of residual linear features created by scanning, melting and solidifying melted portions of a knife blade. This controlled oxidation can be carried out to provide a solid-state lubricating layer on top of the hard sliding surface to facilitate cutting performance. The oxidized regions may exhibit a characteristic color corresponding with the oxide film thickness caused by optical refraction interference effects.

As may be implemented with various embodiments, the term melting in the context of knife blades refers to melting portions of the knife blade, after which some portions of the melted material re-solidifies and other portions of the melted material are removed to create serrations. While a limited amount of ablation of still other material in the knife blade may also occur, the material removed from the serrations is predominantly melted. Resulting structure exhibits properties corresponding to melted and subsequently re-solidified material in the knife blades. These properties include increased hardness, surface roughness corresponding to laser scanning, and width corresponding to laser spot size. For instance, melting in S7 tool steel can be created via pulsed laser micro melting (PLμM) with a laser spot smaller than 500 μm in diameter and pulse durations from 500 ns to 50 μs, and with laser power that is in a window that achieves melting but avoids most or all ablation (e.g., 2-20 W).

In certain experimental-type embodiments, two representative sets of laser scanning parameters are used, one set with a focused 30 μm diameter laser spot and one set with a 100 μm diameter laser spot. The laser spot diameter can be changed by moving the surface of the sample being serrated away from the laser focal plane by 1.8 mm, effectively defocusing the laser beam from 30 μm to 100 μm. The power is set so melting is achieved and ablation avoided in both cases. Fluence (time-integrated flux of laser radiation) may vary due to the variation in beam diameter. Pulse duration can be set as a driven variable, with final pulse shape in terms of peak power, pulse shape, and pulse duration being determined by the ability of an internal laser control algorithm to conform to the prescribed average power, duty cycle, and pulse frequency. A scan velocity of 100 mm/s can be used at the pulsing frequency of 20 kHz to achieve spot spacing of 5 μm.

A blade such as a knife blade is serrated using a laser scanning and melting approach, such as discussed above. The laser light is scanned across a blade surface and edge. The laser light is used to melt a portion of the surface and to melt through the blade at the edge, therein forming serrations via removal of the melted metal. Melting thus may involve applying laser light energy sufficient to melt through a thickness of the blade at the edge and insufficient to melt through a thickness of regions of the blade away from the edge. For instance, heat generation and melt depth can be limited at the regions of the blade away from the edge by utilizing a thickness of the blade as a heat sink. Increased heat generation and melt depth can be achieved at the blade edge having less thickness (and thus less of a heat sink and less metal to absorb the heat), therein melting the portions of the blade at the serration regions. Energy of the laser as well as scan rate/speed may also be varied to apply greater or lesser heat at different regions of the blade.

The laser light can be scanned in a variety of manners. In some embodiments, laser light is scanned along a path that traverses a portion of the blade away from the edge. This scanning may, for example, be carried out independently from a location of the edge, or otherwise without utilizing a location of the edge as a reference (e.g. for limiting the extent of the scanning over portions of the blade away from the edge where the serrations are formed). As such, the scanning can be carried out across and beyond the edge of the blade, across the entire blade, or across and extending beyond both an edge and spine of the blade.

The power of the laser used for scanning in this regard can be set relative to the blade being serrated. For instance, the power can be set to achieve melting at an edge of a knife blade to a thickness at a distance away from the edge corresponding to a desired depth of the serrations. This power can be set to a power level high enough to melt and low enough to avoid ablation.

After melting surface regions of the blade, the blade is cooled. The cooling may set a roughness of the surface regions that matches characteristics of the laser light and its application. For instance, roughness may be set using one or more of laser line spacing, laser pulsing frequency, scan speed, and scan direction. In some embodiments, laser line spacing is controlled such that a new primary roughness is induced orthogonal to the scan direction matching the scan distance and harmonics thereof. A roughness may also be set in the scan direction in the re-melted areas through control of the laser scanning speed, pulsing frequency (if pulsing is employed) and laser spot intensity. Melting and cooling may further involve forming a hardened layer at the surface of the blade, with the hardened layer being thicker when near the edge, about twice as thick as the hardened layer at regions of the blade away from the edge. In some instances, ridges are formed along scan lines on the surface by scanning along lines that are offset and, upon cooling the melted surface regions, providing raised regions along the surface that decease contact area between the blade and a material through which the blade is cutting.

As may be implemented with one or more embodiments, a knife blade apparatus includes an edge portion having a plurality of serrations, and a plurality of recrystallized (re-solidified) scan regions that extend from the serrations in scan lines along a surface of the knife blade. Each recrystallized scan region includes metal recrystallized from portions of the knife blade along the scan lines and extending to a depth below the surface. In connection with such an apparatus, it has been recognized/discovered that locating such recrystallized scan regions extending from serrations can facilitate manufacture and also provide desirable hardness and sliding operability during cutting via the resulting structure. In some embodiments, the knife blade has a thickness at a region thereof away from the edge portion that is greater than a thickness of the knife blade at the edge portion. Recrystallized scan regions at the edge extends through the knife blade, whereas recrystallized scan regions at regions away from the edge extend partially through the knife blade (e.g., with an underlying portion of the knife blade having not undergone melting during scanning). Where laser scanning is used, the recrystallized regions may exhibit a hardened metal having a roughness that matches a harmonic of the laser light. The scan lines may be arranged in a variety of manners, such as in parallel to one another with adjacent recrystallized scan regions being separated from one another by regions of the knife blade having a crystalline form that is different than the recrystallized scan regions (e.g., regions having not undergone melting or having melted to a lesser thickness).

Turning now to the figures, FIG. 1 shows a knife blade 100, in accordance with another embodiment. The knife blade 100 is shown in a cut-away view, and may include additional material such as a tang that can be coupled to a handle. The knife blade 100 has an edge at 110 and a surface that extends from the edge to a spine 120. The thickness of the knife blade tapers moving from the spine 120 toward the edge 110, such that the thickness at the edge is less than the thickness at surface regions away from the edge, which facilitates melting and formation of edge serrations.

The knife blade 100 has been serrated, with portions melted and re-solidified along scan lines as may be implemented in a direction as shown by the two-sided arrow. Inset 105 shows serrations, as may be implemented in accordance with one or more embodiments. By way of example, serrations 112 and 114 are labeled with a point region 116 between the serrations. Re-solidified regions extend from the serrations toward the spine 120, along a direction of the scan lines as depicted by the arrow. The portion of knife blade 100 along these scan lines at the edge 110 have been melted through and removed, leaving the half-circle type serrations (including 112 and 114) as shown.

In some embodiments, the knife blade 100 has a thickness that tapers from a point noted at line 130, becoming thinner near the edge 110. This taper may be on one or both sides of the knife blade. As may be implemented in accordance with one or more embodiments, Section A-A shows an example one-sided taper as the knife blade thins as it nears the edge 110.

Various embodiments are directed towards methods of manufacturing the knife blade 100. Such embodiments may involve scanning a laser along scan lines in the directions shown by the arrows in FIG. 1. Heat from the laser is utilized to melt portions of the knife blade, in which the portions at the serrations are removed (e.g., as shown at 112 and 114). This approach may be carried out without necessarily ablating any of the knife blade (or with ablating a negligible amount), which can be controlled by the amount of heat applied. Thicker portions of the knife blade away from the edge 110 can be used to absorb heat and limit the amount of melting, such that the knife blade isn't melted through as it is near the edge 110. This approach facilitates serration without necessarily using the edge 110 as a reference point (e.g., as may be required for ablation so as to limit the area in which metal is removed). Further, re-solidified portions of the knife blade as melted in areas away from the edge 110 can provide enhanced characteristics, such as hardness and reduced sliding friction/force.

Figure 2:
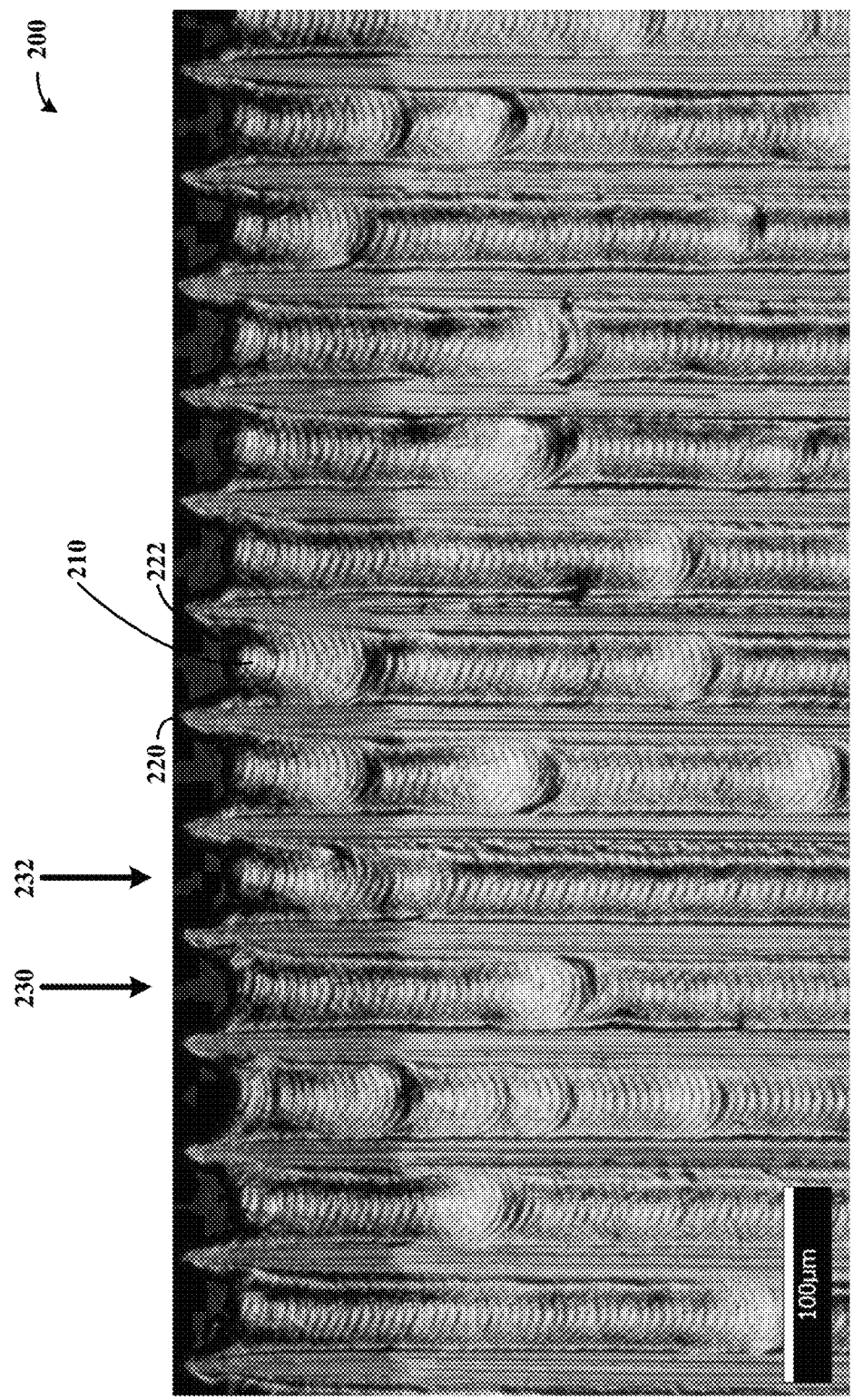
FIG. 2 shows an image of a portion of a serrated knife blade, as may be implemented in accordance with one or more embodiments.

FIG. 2 shows an image of a portion of a serrated knife blade 200, as may be implemented in accordance with one or more embodiments (e.g., with a knife blade similar to that shown in FIG. 1). The knife blade 200 includes several serrations, with points/edges between each serration. By way of example, serration 210 is labeled with adjacent points 220 and 222. Re-solidified material extends from the serrations along scan lines, with scan lines 230 and 232 labeled by way of example. The re-solidified material exhibits characteristics that are altered relative to underlying metal not having been melted, such as increased hardness. Further, the scan lines may exhibit a surface roughness that corresponds to melting, such as may be carried out with a laser in which the roughness exhibits a ridged characteristic corresponding to a set of processing conditions. In various embodiments, roughness across laser scanned lines (about perpendicular thereto) can be set based on laser operating conditions and laser line spacing. Further, while the embodiments herein may be implemented with various serration sizes (and corresponding laser spot sizes), by way of example a reference of 100 µm is shown for spanning two serrations (e.g., about 50 µm per serration).

Figure 3:
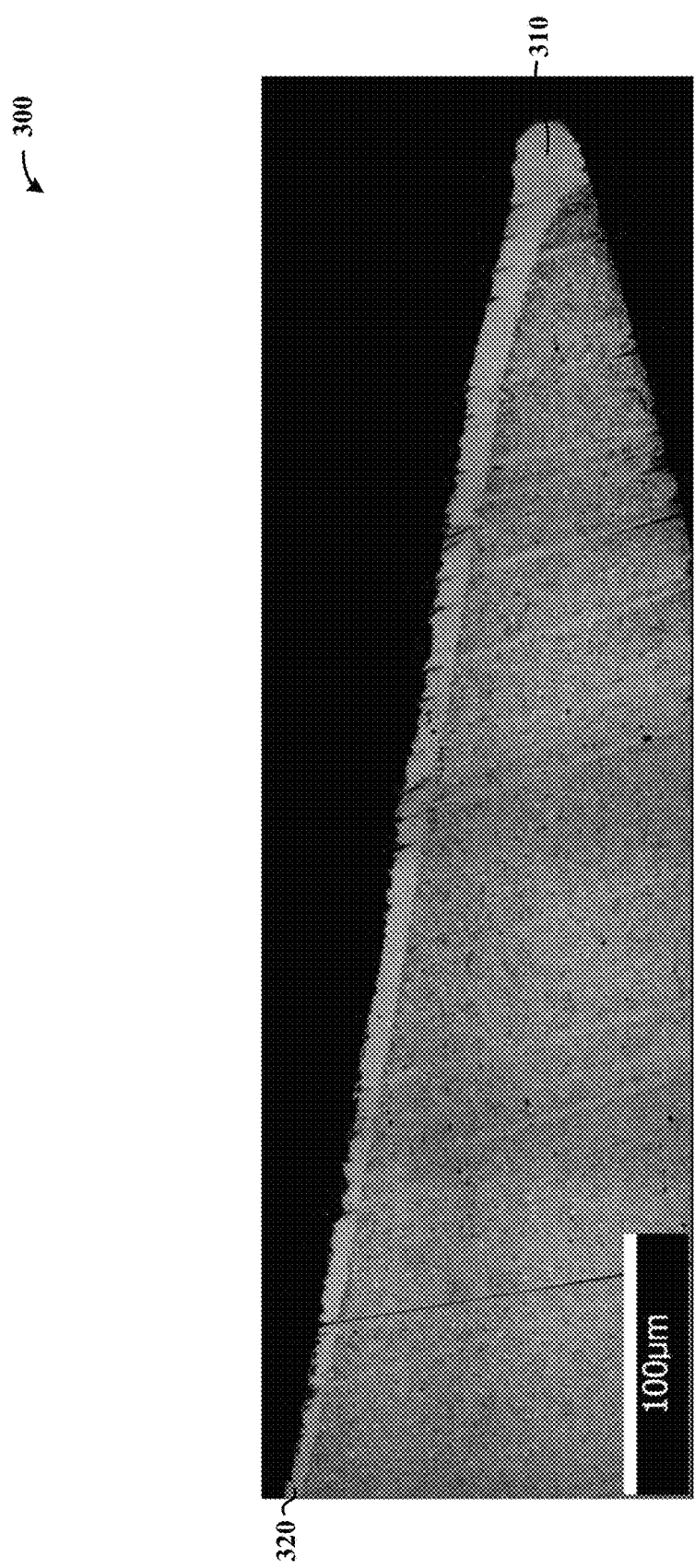
FIG. 3 shows a cross-sectional image of a knife blade, as may be implemented in accordance with one or more embodiments.

FIG. 3 shows a cross-sectional image of a knife blade 300, as may be implemented in accordance with one or more embodiments. The knife blade 300 has been treated with a laser for melting portions thereof, and formation of a serration near tip 310. Melted portions have re-solidified, with a layer 320 near an upper surface of the knife blade having been re-solidified and exhibiting increased hardness. The thickness of the knife blade limits/sets the thickness of layer 320, with the thickness at the tip 310 extending through the entire blade thickness (e.g., at a serration and/or between adjacent serrations). The knife blade 300 and related approaches may, for example, be implemented with the knife blade shown in FIG. 1.

Figure 4:
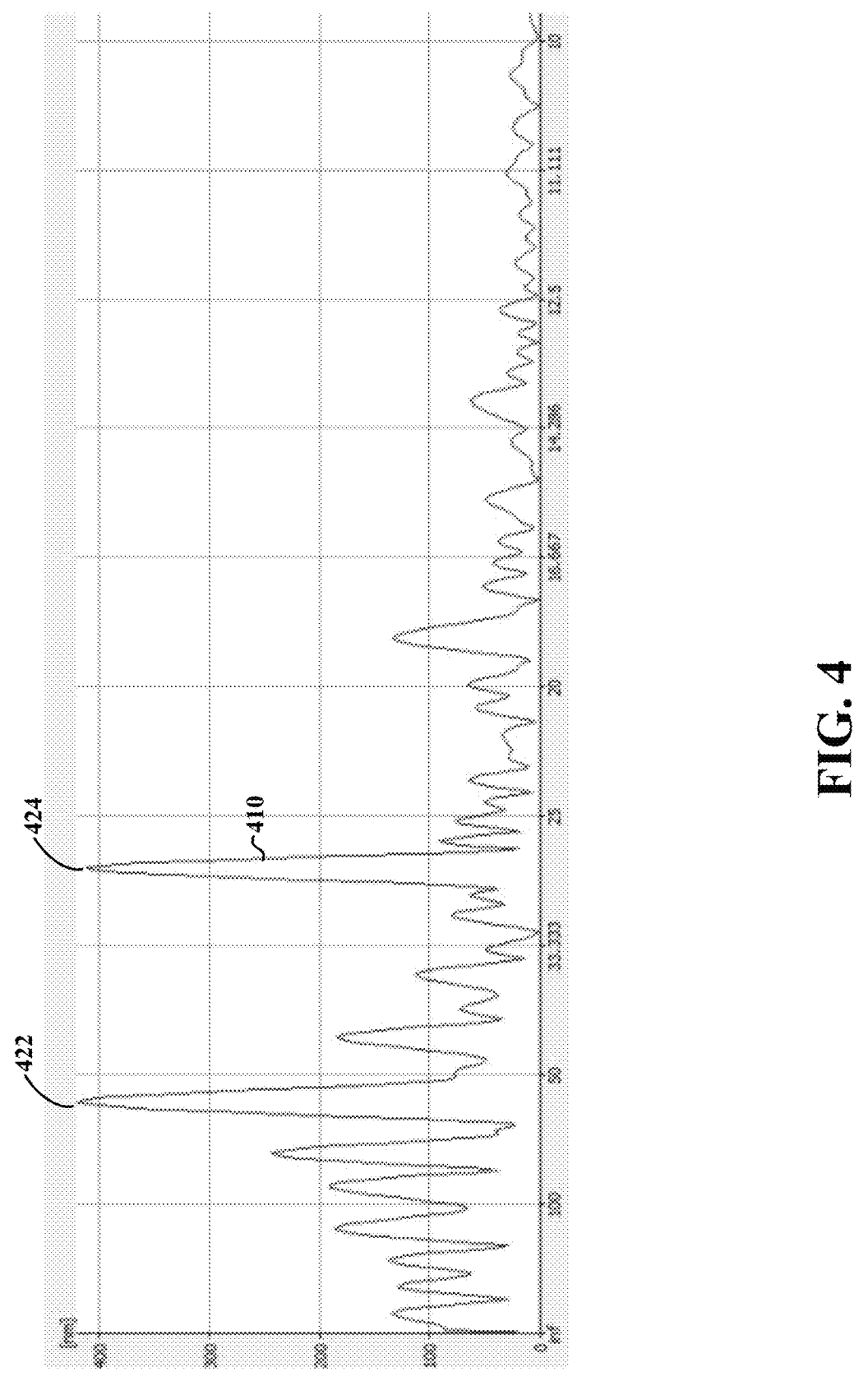

FIG. 4 shows a plot 410 of a linear surface profile for a knife blade, as may be implemented in accordance with one or more embodiments. Plot 410 is shown in the frequency (wavelength) domain, with peak 422 corresponding to the line spacing and 424 corresponding to half the line spacing for scan lines implanted for serration.

Figure 5:
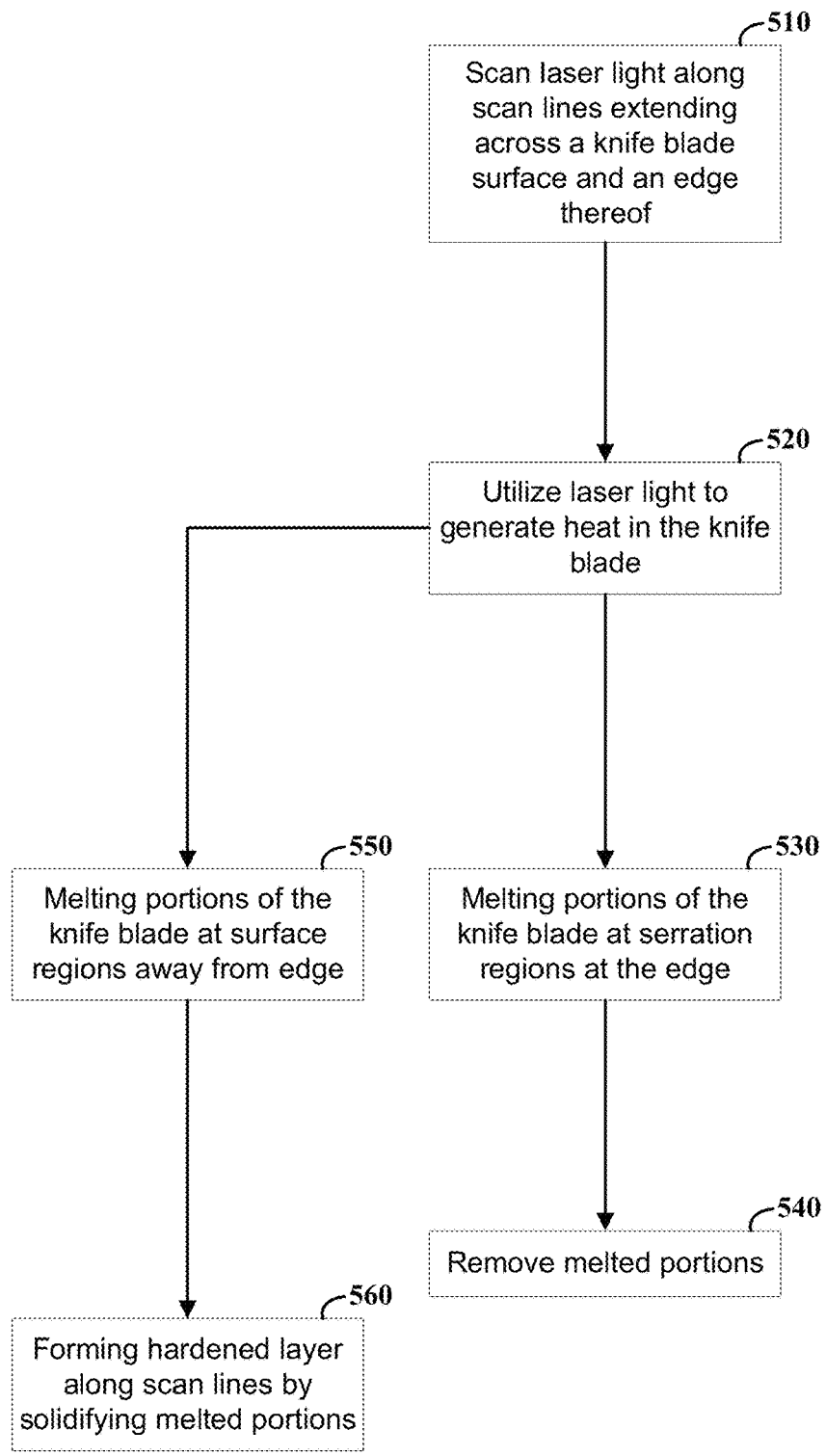
FIG. 5 shows a method for forming a knife blade, as may be implemented in accordance with one or more embodiments.

FIG. 5 shows a method for forming a knife blade, as may be implemented in accordance with one or more embodiments. At block 510, laser light is scanned along scan lines extending across a knife blade surface and an edge thereof. The light may, for example, thus be scanned beyond the edge and across some or all of a surface of the knife blade (e.g., across a tapered region or across an entire blade to the spine of the knife). At block 520, the laser light is used to generate heat in the knife blade, which melts portions of the knife blade at serration regions of the edge at block 530. The heat may also be used to melt portions of the knife blade at surface regions away from the edge at block 550. In this context, these blocks/steps may be carried out concurrently and/or as part of a common scan process.

For the serrations, the melted portions are removed at block 540. This may involve, for example, some evaporation or other removal after metal in the knife blade has been melted. For those portions of the knife blade away from the edge (e.g., with an underlying portion of metal remaining in a solid or solidous state), a hardened layer is formed along the scan lines at block 560 as the melted portions are solidified.

Various embodiments employ blocks, modules or other circuits to carry out one or more of the operations and activities described herein and/or shown in the figures. In these contexts, a "block" (also sometimes "logic circuitry" or "module") is a circuit that carries out one or more of these or related operations/activities (e.g., controlling a laser scanning apparatus, determining a power or other scan characteristic based on knife blade characteristics). For example, in certain of the above-discussed embodiments, one or more modules are discrete logic circuits or programmable logic circuits configured and arranged for implementing the operations/activities, as in the modules shown in FIG. 5. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon instructions which may be executed by a computer (or other electronic device) to perform these operations/activities, such as for controlling a laser scanning apparatus.

Based upon the above discussion and illustrations, those skilled in the art will readily recognize that various modifications and changes may be made to the various embodiments without strictly following the exemplary embodiments and applications illustrated and described herein. For example, different scanning approaches, scan line orientations, heat sources, scanning equipment and operational conditions can be implemented to suit particular embodiments. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. A method comprising:
    scanning laser light across a surface of a knife blade, and intersecting the laser light with an edge of the knife blade; and
    utilizing the laser light to serrate the edge of the knife blade by:
        generating heat in the knife blade while the laser light is scanned,
        melting portions of the knife blade at serration regions at the edge, and
        removing the melted portions.

2. The method of claim 1, wherein melting the portions of the knife blade at the serration regions at the edge includes applying laser light energy sufficient to melt through a thickness of the knife blade at the edge and insufficient to melt through a thickness of regions of the knife blade away from the edge.

3. The method of claim 2, wherein generating heat in the knife blade includes:
    limiting heat generation and melt depth at the regions of the knife blade away from the edge by utilizing a first thickness of the knife blade thereat as a heat sink, and
    providing increased heat generation and melt depth at the knife blade edge by utilizing a second thickness at the edge that is less than the first thickness, therein melting the portions of the knife blade at the serration regions.

4. The method of claim 1, wherein the step of scanning the laser light across a surface of a knife blade includes scanning the laser light along a path that traverses a portion of the knife blade away from the edge.

5. The method of claim 4, wherein the step of utilizing the laser light to serrate the edge of the knife blade includes scanning the laser light independently from the edge.

6. The method of claim 4, wherein the step of utilizing the laser light to serrate the edge of the knife blade includes scanning the laser light without utilizing the edge as a reference.

7. The method of claim 1, wherein melting the portions of the knife blade at the serration regions at the edge and removing the melted portions includes melting and removing the portions using a laser scanning at a power level high enough to melt and low enough to avoid ablation.

8. The method of claim 1, wherein generating heat in the knife blade while the laser light is scanned includes melting surface regions of the knife blade and in the serration regions, further including cooling the melted surface regions and setting a roughness of the surface regions via spacing of scan lines along which the laser light is scanned.

9. The method of claim 1, further including forming a hardened layer at the surface of the knife blade by melting regions of the knife blade at the surface and subsequently cooling the melted regions, the hardened layer near the edge being about twice as thick as the hardened layer at regions of the knife blade away from the edge.

10. The method of claim 1, wherein the step of scanning the laser light across the surface of the knife blade includes scanning the laser light along a path that traverses a portion of the knife blade away from the edge and that intersects the edge.

11. The method of claim 10, wherein the path extends beyond the edge.

12. The method of claim 1, further including providing the knife blade with a thickness at the edge that is less than a thickness of a portion of the knife blade away from the edge.

13. The method of claim 12, wherein melting portions of the knife blade at serration regions at the edge includes using the thickness of the knife blade and the laser light to melt the serration regions while maintaining portions of the knife blade away from the edge and portions of the knife blade between the serration regions in a solid state.

14. The method of claim 1, wherein scanning the laser light across the surface of the knife blade includes scanning the laser light along parallel paths, each path intersecting the edge of the knife blade and being offset from one another by a distance.

15. The method of claim 1, wherein the step of utilizing the laser light to serrate the edge of the knife blade includes controlling a speed of the scanning to generate a sufficient amount of the heat in the knife blade at the serration regions to facilitate the melting.

16. The method of claim 1, wherein the step of scanning laser light across a surface of a knife blade includes melting surface regions of the knife blade, further including forming ridges along scan lines on the surface by cooling the melted surface regions, thereby providing raised regions along the surface that decease contact area between the knife blade and a material through which the knife blade is cutting.

17. A knife blade apparatus comprising:
an edge portion having a plurality of serrations; and
a plurality of recrystallized scan regions extending from the serrations in scan lines along a surface of the knife blade, each recrystallized scan region including metal recrystallized from portions of the knife blade along the scan lines and extending to a depth below the surface.

18. The apparatus of claim 17, wherein
the knife blade has a first thickness at a region thereof away from the edge portion that is greater than a second thickness of the knife blade at the edge portion, and
for each of the recrystallized scan regions, a portion of the scan regions at the second thickness includes recrystallized metal extending through the knife blade, and another portion of the scan regions at the first thickness includes recrystallized metal extending partially through the knife blade.

19. The apparatus of claim 17, wherein the plurality of recrystallized scan regions are parallel to one another, adjacent ones of the recrystallized scan regions being separated from one another by regions of the knife blade having a crystalline form that is different than the recrystallized scan regions.

20. The apparatus of claim 17, wherein a surface of the recrystallized scan regions exhibits a hardened metal having a roughness that is based on spacing of the scan lines.

* * * * *